Feb. 18, 1958  C. C. JACOBS  2,823,735
AUTOMOBILE SEAT TRIM
Filed Nov. 16, 1953
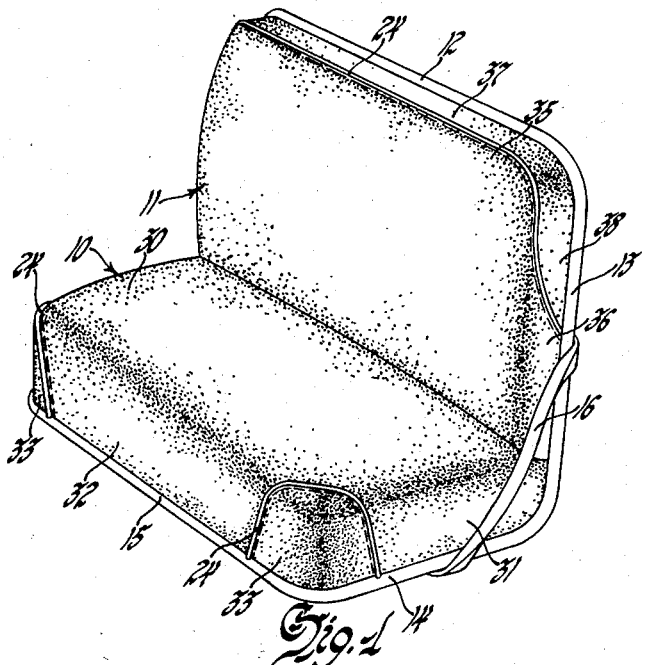
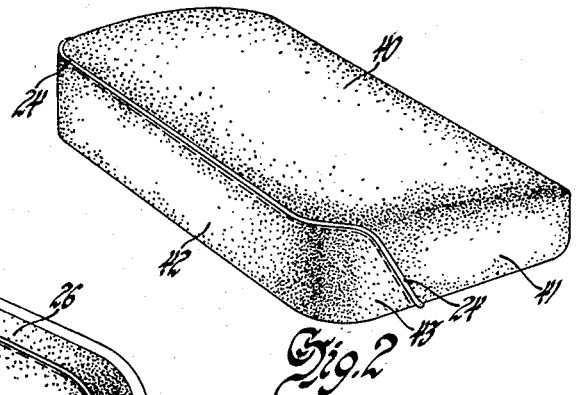
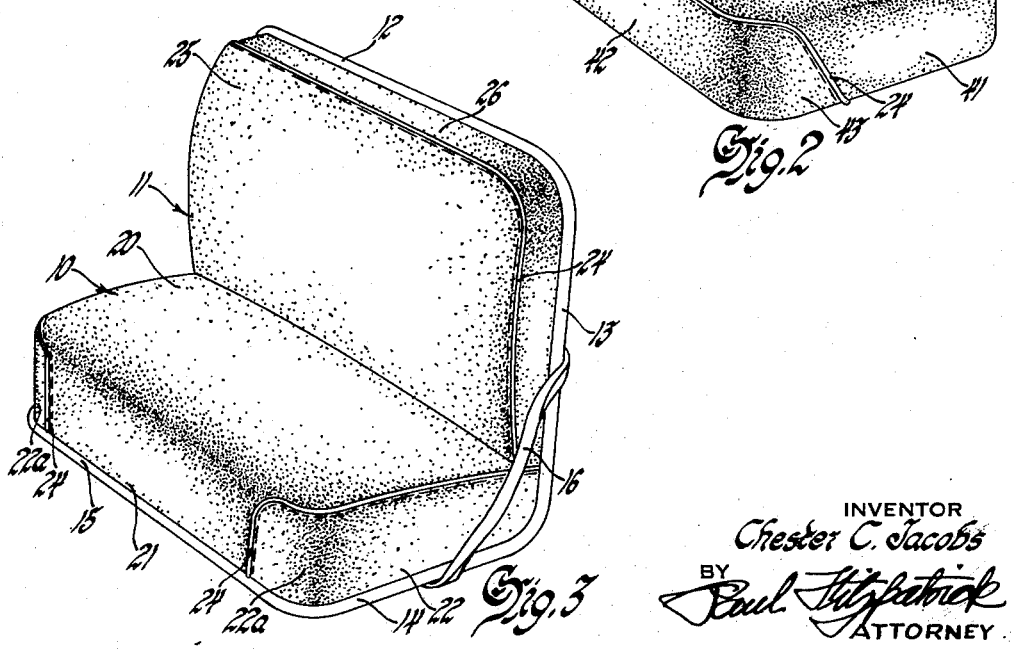
INVENTOR
Chester C. Jacobs
BY
Paul Fitzpatrick
ATTORNEY ced Feb. 18, 1958

2,823,735

AUTOMOBILE SEAT TRIM

Chester C. Jacobs, Mooresville, Ind., assignor to General Motors Corporation, Detroit, Mich., a corporation of Delaware Application November 16, 1953, Serial No. 392,175

6 Claims. (Cl. 155—182)

This invention relates to automobile seat trim, and more particularly to an improved permanent covering for the seat cushion and seat back.

One feature of the invention is that it provides an improved permanent seat covering; another feature of the invention is that it provides a seat covering in which the cord welt seam is eliminated at locations of greatest stress; still another feature of the invention is that it provides a seat cover comprising a primary member which covers substantially the entire supporting surface of the seat and which extends without a break across the major area of the outside edge surface of the seat so that the cord welt is eliminated in the area of greatest stress; yet a further feature of the invention is that a skirt member covers the remaining area of the outside edge surface of the seat adjacent a corner thereof, and a cord welt seam secures the primary member and skirt members together; yet another feature of the invention is that the skirt member extends around said corner of the seat and the cord welt is located adjacent the corner, the welt being eliminated along the major portion of the edge of the seat.

Other features and advantages of the invention will be apparent from the following description and from the drawings, in which:

Fig. 1 is a perspective view of an automobile seat embodying the invention on the seat cushion and the seat back.

Fig. 2 is a perspective view of a seat cushion embodying the invention in a modified form; and Fig. 3 is a perspective view of a seat constructed in conventional manner, which seat does not embody the invention.

Automobile seats conventionally are constructed with cord welt seams extending along each outside edge of the seat cushion cover from the front corner of the seat to the rear corner thereof, and with cord welt seams extending down along each outside edge of the seat back cover from the top corner to the bottom corner thereof. In passenger cars, this construction is not objectionable; however, in trucks and other commercial vehicles which are generally subjected to a rougher type of service, trouble has been experienced because the cord welt seams pull apart, necessitating replacement of the covers of the seat long before the end of the useful life of the vehicle. The cord welt seams do not often pull apart at the front corners of the cushion or at the top corners of the seat back in normal usage, and the trouble is almost entirely confined to the center and rear side portion of the seat cushion and lower side portion of the seat back. When an occupant of the truck slides in and out of the seat, the majority of weight of his body strikes against the cord welt seam in these areas with consequential early failure of the cord welt seam in these locations.

This invention provides a novel seat covering construction in which the cord welt seam is eliminated in these critical areas, but is retained in less critical areas adjacent the front corner of the seat cushion and top corner of the seat back to provide the desired strength and good appearance features of the automobile seat.

Referring now more particularly to the drawings, one type of conventional construction which is presently in use is shown in Fig. 3. A seat cushion 10 and a seat back 11 are mounted in a tubular frame comprising a top rail 12, side rails 13, bottom side rails 14 and a bottom front rail 15. At each side of the seat a brace 16 extends between the side rail 13 and the associated bottom side rail 14.

The seat cushion 10 has a permanent outer primary cover member 20 having a main portion entirely covering the generally horizontal seating surface and an integral skirt portion 21 which extends down and across the major area of the front edge of the seat, but which terminates short of the opposite front corners of the seat. At each side of the seat there is a skirt cover member 22 which entirely covers the side edge surface of the seat and which extends around the front corner of the seat at 22a, the edges of the primary cover member 20 and the skirt member 22 abutting along the side edge of the seating surface and along the front edge surface inwardly from the corner of the seat. The abutting edges of these members are secured tgether by means of a conventional cord welt seam 24.

The seat back 11 has a vertical supporting surface which is entirely covered by a primary cover member 25, and a skirt member 26 covers the top edge surface of the seat back and the opposite outer edge surfaces thereof, a conventional cord welt seam 24 securing the abutting edges of the primary member and skirt member together.

These seat covers are permanently secured to the seat cushion and seat back when the vehicle is manufactured, and the cover members are made of some kind of flexible fabric material, the term "fabric" as used in the specification and claims including leather, leatherette and the like.

In normal use, whenever an occupant gets into or out of the vehicle, his body moves across the cord welt seam transversely thereof, exerting a force tending to tear the seam apart. Since only a small portion of the weight of the occupant's body strikes the seat cushion cord welt adjacent the front corner of the seat cushion, this portion of the cord welt seam is generally not damaged over long periods of ordinary use, and the same is true of the cord welt seam near the upper corner of the seat back at the side thereof. However, the bulk of the weight of the occupant strikes the seat cushion cord welt in a location extending from a few inches rearwardly from the front corner to the rear of the cushion; and, since the occupant generally leans forward as he gets in and out, the bulk of the wear on the seat back welt occurs along that portion of the welt which extends downwardly from a few inches below the upper corner of the seat back.

Fig. 1 shows a seat cover constructed in accordance with the invention in which the cord welt is eliminated from the locations in which it is most likely to be damaged during use of the automobile, but is retained in less critical locations. In Fig. 1, the internal construction of the seat may be conventional and is therefore not shown.

According to the invention, the seat cover comprises a primary member 30 covering the entire generally horizontal supporting surface and extending without a break across the major area of the outside edge surface as shown at 31 in Fig. 1. In the embodiment of the invention illustrated in Fig. 1, the primary cover also covers the major portion of the front edge surface as shown at 32, although it is not necessary to the invention that this latter skirt portion 32 be integral with the seating surface covering portion. In any event, the primary member does not extend around the front corners of the seat cushion and each corner is covered by a skirt member 33 which covers the remaining area of the outside edge surface of the seat cushion and which extends around the front corner of the cushion. The edges of the primary member 30 and each skirt member 33 abut and are secured together by means of conventional cord welt seams 24, these seams being of the same construction as the seam shown in Fig. 3, but covering different areas than the seam of Fig. 3.

The seat back has a generally vertical supporting surface, a top edge surface and opposite outside edge surfaces. The main supporting surface is covered by a primary cover member 35 which extends without a break across the lower area of the outside edge surface as shown at 36. A separate skirt 37 covers the entire top edge surface and extends around the upper corner of the seat back and covers the remaining portion of the outside edge surface as shown at 38. A conventional cord welt seam 24 secures the abutting edges of the primary cover member 35 and the skirt together.

This construction provides a seat covering for cushions and backs which has the necessary strength for truck usage by using cord welt seams at the corners and which eliminates the vulnerable areas of the cord welt seams since the primary cover member extends without a break across the major area of the outside edge surface of the seat cushion and the seat back, respectively. When the driver or other occupant slides into or out of the truck, the majority of the weight of his body presses on the unbroken primary cover members and does not strike the cord welt seam. In the areas where the cord welt is used, so little force is applied to the welt in ordinary usage that it is not damaged. The seat corners pass underneath the occupant's knees as he enters and leaves the automobile, and very little weight is applied against these corner seams. Similarly, near the upper corner of the seat back, very little force is applied because the occupant leans forwardly when he enters or leaves the automobile. While the improved cover may be made of any suitable material, it preferably is made of a flexible fabric, such as leather or artificial leather.

Fig. 2 shows a modified form of seat cushion construction wherein the primary cover member 40 covers the entire generally horizontal seating surface of the cushion and extends without a break down over the major area of the outside edge surface of the cushion as shown at 41, the primary cover terminating short of the front corner. Instead of using separate skirts in the form of a "patch" at each corner as is illustrated in Fig. 1, the modified form of Fig. 2 utilizes a single skirt member 42 which covers the entire front edge surface of the cushion and which extends around each front corner of the cushion to cover the remaining areas of the side edge surface as shown at 43. Again, the abutting surfaces of the primary cover member and the skirt member are secured together by means of a conventional cord welt seam 24.

The construction shown in Fig. 2 has all the advantages of the seat cushion shown in Fig. 1 since the cord welt seam is eliminated in the crucial area extending from a few inches back of the front corner of the cushion to the rear thereof.

While I have shown and described various embodiments of my invention, it is capable of many modifications. Changes, therefore, in the construction and arrangement may be made without departing from the spirit and scope of the invention as set forth in the appended claims.

I claim:

1. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of at least one of said vertical surfaces and terminating along said vertical surface short of a front corner, a skirt member covering said last-mentioned front corner, and means securing the skirt member to the primary member.

2. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of at least one of said vertical surfaces and terminating along said vertical surface short of a front corner, a skirt member covering said last-mentioned front corner, and a cord welt seam securing the skirt member to the primary member in the plane of the primary member.

3. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of the side edge and front edge surfaces and terminating along said side and front edge surfaces short of said front corners, a skirt member covering each of said front corners, and means securing each skirt member to the primary member.

4. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of the side edge and front edge surfaces and terminating along said side and front edge surfaces short of said front corners, a skirt member covering each of said front corners, and a cord welt seam securing each skirt member to the primary member in the plane of the primary member.

5. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of each side edge surface and terminating along said side edge surfaces short of said front corners, a skirt member covering the entire front edge surface and extending around each front corner into abutting relationship with the edges of said primary member, and means securing the skirt member to the primary member.

6. In combination, an automobile seat having a generally horizontal supporting surface, generally vertical side edge surfaces and a generally vertical front edge surface which joins each side edge surface to form opposite front corners, a primary member covering substantially the entire supporting surface and extending without a break over the major portion of the front edge surface and terminating along said front edge surface short of each front corner, a skirt member covering each of said side edge surfaces and extending around each front corner into abutting relationship with an edge of said primary member, and means securing each skirt member to the primary member.

References Cited in the file of this patent
UNITED STATES PATENTS

| Number | Name | Date |
| --- | --- | --- |
| 1,996,575 | Fry et al. | Apr. 2, 1935 |
| 2,367,450 | Trubitz | Jan. 16, 1945 |
| 2,446,396 | Waranch | Aug. 3, 1948 |
| 2,546,109 | Puchalsky | Mar. 20, 1951 |
| 2,619,156 | Seaman | Nov. 25, 1952 |
| 2,674,300 | Liljengren et al. | Apr. 6, 1954 |